(12) United States Patent
Bardalai et al.

(10) Patent No.: US 9,923,805 B2
(45) Date of Patent: Mar. 20, 2018

(54) BACKWARD-RECURSIVE PATH COMPUTATION USING RSVP-TE

(71) Applicants: Snigdho Chandra Bardalai, San Ramon, CA (US); Rajan Rao, Fremont, CA (US); Charles Andrew Palmer Moorwood, Sunnyvale, CA (US)

(72) Inventors: Snigdho Chandra Bardalai, San Ramon, CA (US); Rajan Rao, Fremont, CA (US); Charles Andrew Palmer Moorwood, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 856 days.

(21) Appl. No.: 13/849,138

(22) Filed: Mar. 22, 2013

(65) Prior Publication Data

US 2014/0156751 A1 Jun. 5, 2014

Related U.S. Application Data

(60) Provisional application No. 61/733,821, filed on Dec. 5, 2012.

(51) Int. Cl.
*G06F 15/16* (2006.01)
*H04L 12/707* (2013.01)
(Continued)

(52) U.S. Cl.
CPC .............. *H04L 45/22* (2013.01); *H04L 45/04* (2013.01); *H04L 45/50* (2013.01)

(58) Field of Classification Search
CPC .......... H04L 45/22; H04L 45/04; H04L 45/50
(Continued)

(56) References Cited

U.S. PATENT DOCUMENTS 8,259,564 B1 * 9/2012 Gredler ................. H04L 45/507
370/218
8,848,705 B2 * 9/2014 Chen ....................... H04L 45/50
370/238
(Continued)

OTHER PUBLICATIONS

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.*
(Continued)

*Primary Examiner* — Bharat N Barot
(74) *Attorney, Agent, or Firm* — David L. Soltz

(57) ABSTRACT

One or more nodes, in a network, are configured to transmit a message, for computing diverse paths through the network from a first domain to a second domain using a Resource Reservation Protocol-Traffic Engineering (RSVP-TE) signaling protocol; generate at least one data structure that identifies multiple diverse entry points to the second domain; transmit the at least one data structure toward the first domain; complete the at least one data structure to form at least one completed data structure; use a first data structure, of the at least one completed data structure, to compute a primary path from the first domain to the second domain; and use a second data structure, of the at least one completed data structure, to compute a secondary path from the first domain to the second domain.

21 Claims, 10 Drawing Sheets

(51) Int. Cl.
*H04L 12/715* (2013.01)
*H04L 12/723* (2013.01)

(58) Field of Classification Search
USPC ......... 709/204–207, 238–239; 370/351, 238, 370/248
See application file for complete search history.

(56) References Cited

U.S. PATENT DOCUMENTS

| | | | | |
|---|---|---|---|---|
| 9,660,897 | B1* | 5/2017 | Gredler | .................... H04L 45/04 |
| 2006/0098587 | A1* | 5/2006 | Vasseur | .................... H04L 45/04 |
| | | | | 370/254 |
| 2006/0171320 | A1* | 8/2006 | Vasseur | .................... H04L 45/02 |
| | | | | 370/238 |
| 2007/0019558 | A1* | 1/2007 | Vasseur | ............... H04L 41/5022 |
| | | | | 370/248 |
| 2007/0133406 | A1* | 6/2007 | Vasseur | .................... H04L 45/02 |
| | | | | 370/230 |
| 2009/0279544 | A1* | 11/2009 | Ayanampudi | ........... H04L 12/18 |
| | | | | 370/389 |
| 2010/0039939 | A1* | 2/2010 | Wang | ...................... H04L 45/42 |
| | | | | 370/238 |
| 2010/0208733 | A1* | 8/2010 | Zhao | .................... H04L 12/185 |
| | | | | 370/390 |
| 2011/0063972 | A1* | 3/2011 | Muley | ................ H04L 12/1877 |
| | | | | 370/225 |
| 2012/0308225 | A1* | 12/2012 | Long | ...................... H04L 45/04 |
| | | | | 398/13 |
| 2013/0089005 | A1* | 4/2013 | Li | ......................... H04L 45/025 |
| | | | | 370/255 |

OTHER PUBLICATIONS

Farrel et al., "A Path Computation Element (PCE)—Based Architecture", Network Working Group, RFC-4655, Aug. 2006, 40 pages.
Vasseur et al., "A Backward-Recursive PCE-based Computation (BRPC) Procedure to Compute Shortest Constrained Inter-Domain Traffic Engineering Label Switched Paths", Network Working Group, RFC-5441, Apr. 2009, 18 pages.

* cited by examiner

BACKWARD-RECURSIVE PATH COMPUTATION USING RSVP-TE

RELATED APPLICATION

This application is a non-provisional of U.S. Provisional Application No. 61/733,821, filed Dec. 5, 2012, the contents of which are incorporated herein by reference.

BACKGROUND

Constraint-based path computation is a fundamental building block for traffic engineering systems, such as Multiprotocol Label Switching (MPLS) and Generalized Multiprotocol Label Switching (GMPLS) networks. Performing path computation in large, multi-domain, multi-region, or multi-layer networks can be quite complex and may require special computational components and cooperation between the different network domains.

One existing approach to the path computation problem involves the use of a Path Computation Element (PCE)-based model. The PCE-based model includes a PCE entity that is capable of computing a network path or route based on a network graph. The PCE is an application that can be located within a network node or component or on an out-of-network server.

Multiple PCEs can be used to compute inter-domain shortest constrained paths across a predetermined sequence of domains using a backward-recursive path computation technique. The backward-recursive path computation technique relies on communication between cooperating PCEs. In particular, a path computation client (PCC) sends a request to a PCE in its domain. The request is forwarded between PCEs, domain-by-domain, until the PCE responsible for the domain containing the LSP destination (i.e., the destination domain) is reached. The PCE in the destination domain creates a tree of potential paths to the destination (referred to as a Virtual Shortest Path Tree or VSPT) and passes the VSPT back to the previous PCE. Each PCE, in turn, adds to the VSPT and passes the VSPT back until the PCE in the source domain uses the VSPT to select an end-to-end path that the PCE sends to the PCC.

SUMMARY

According to some example implementations, a method may include transmitting a message, for computing diverse paths through a network that includes a group of domains, using a Resource Reservation Protocol-Traffic Engineering (RSVP-TE) signaling protocol, where the message may be transmitted from a first node in a first domain to a second node in a second domain; generating, by the second node in the second domain, at least one data structure that identifies multiple diverse entry points to the second domain; transmitting the at least one data structure toward the first node in the first domain; completing, by the first node in the first domain, the at least one data structure to form at least one completed data structure, where the at least one completed data structure may identify multiple diverse exit points from the first domain and the multiple diverse entry points to the second domain; causing, using a first data structure of the at least one completed data structure, a primary path from the first domain to the second domain to be established, where the primary path may include a first exit point, of the multiple diverse exit points from the first domain, and a first entry point of the multiple diverse entry points to the second domain; and causing, using a second data structure of the at least one completed data structure, a secondary path from the first domain to the second domain to be established, where the secondary path may include a second exit point, of the multiple diverse exit points from the first domain, and a second entry point of the multiple diverse entry points to the second domain.

According to some example implementations, a system may include a group of nodes in a network that includes a group of sections. One or more nodes, of the group of nodes, may be configured to: transmit a message, for computing diverse paths through the network from a first section, of the group of sections, to a second section of the group of sections, using a RSVP-TE signaling protocol, where the message may be transmitted from a first node, in the first section, to a second node in the second section; generate, by the second node in the second section, at least one data structure that identifies multiple diverse entry points to the second section; transmit the at least one data structure toward the first node in the first section; complete, by the first node in the first section, the at least one data structure to form at least one completed data structure, where the at least one completed data structure may identify multiple diverse exit points from the first section and the multiple diverse entry points to the second section; cause, using a first data structure of the at least one completed data structure, a primary path from the first section to the second section to be established, where the primary path may include a first exit point, of the multiple diverse exit points from the first section, and a first entry point of the multiple diverse entry points to the second section; and cause, using a second data structure of the at least one completed data structure, a secondary path from the first section to the second section to be established, where the secondary path may include a second exit point, of the multiple diverse exit points from the first section, and a second entry point of the multiple diverse entry points to the second section.

According to some example implementations, a system may include a group of nodes in a network that includes a group of domains or layers. One or more nodes, of the group of nodes, may be configured to: transmit a message, for computing diverse paths through the network from a first domain or layer, of the group of domains or layers, to a second domain or layer of the group of domains or layers, using a RSVP-TE signaling protocol, where the message may be transmitted from a first node, in the first domain or layer, to a second node in the second domain or layer; generate, by the second node in the second domain or layer, at least one data structure that identifies multiple diverse entry points to the second domain or layer; transmit the at least one data structure toward the first node in the first domain or layer; complete, by the first node in the first domain or layer, the at least one data structure to form at least one completed data structure, where the at least one completed data structure may identify multiple diverse exit points from the first section and the multiple diverse entry points to the second domain or layer; use a first data structure, of the at least one completed data structure, to compute a primary path from the first domain or layer to the second domain or layer, where the primary path may include a first exit point, of the multiple diverse exit points from the first domain or layer, and a first entry point of the multiple diverse entry points to the second domain or layer; and use a second data structure, of the at least one completed data structure, to compute a secondary path from the first domain or layer to the second domain or layer, where the secondary path may include a second exit point, of the multiple diverse exit points from the first domain or layer, and a second entry point of the multiple diverse entry points to the second domain or layer.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

An implementation, described herein, may compute inter-domain shortest constrained paths across a predetermined sequence of domains using a backward-recursive path computation technique based on a Resource Reservation Protocol-Traffic Engineering (RSVP-TE) signaling protocol and without using PCEs. As a result, PCE communication delays may be avoided, thereby improving performance.

Figure 1:
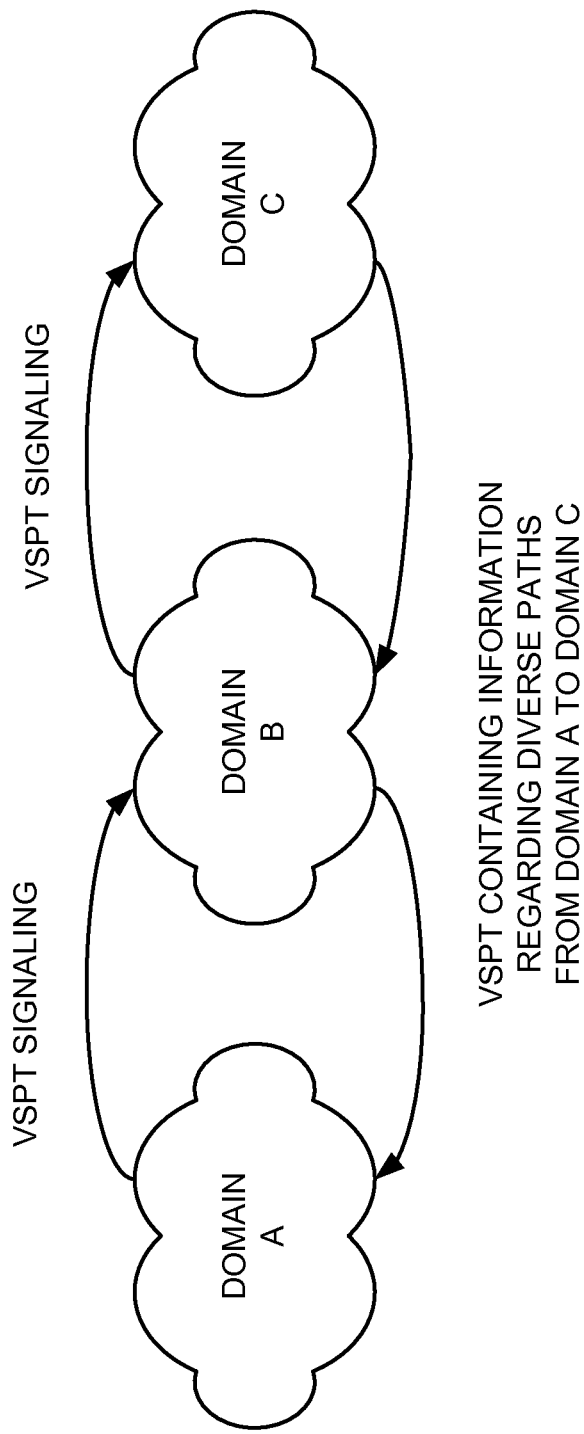
FIG. 1 is a diagram of an overview of an example implementation described herein.

FIG. 1 is a diagram of an overview of an example implementation described herein. Assume, for the overview of FIG. 1, that it is desired to compute multiple, diverse paths from a domain A to a domain C via a domain B. A node, within domain A, may initiate VSPT messaging by sending a message to a node within domain B. As used herein, a node may refer to a network device, such as a routing device or a transport device. The node, within domain B, may send the message to a node within domain C. A node, within domain C, may begin creating a VSPT with information identifying multiple entry nodes into domain C (i.e., nodes acting as entry points to domain C). The VSPT, at this point, may include information for multiple, diverse paths terminating within domain C. A node, within domain C, may send the VSPT to a node within domain B.

A node, within domain B, may supplement the VSPT with information identifying multiple entry nodes into domain B (i.e., nodes acting as entry points to domain B) and information identifying multiple exit nodes from domain B (i.e., nodes acting as exit points from domain B) that connect to the entry nodes of domain C. Thus, the VSPT, at this point, may include information for multiple, diverse paths traversing domain B and terminating within domain C. A node, within domain B, may send the VSPT to a node within domain A.

A node, within domain A, may complete the VSPT with information identifying multiple exit nodes from domain A (i.e., nodes acting as exit points from domain A) that connect to the entry nodes of domain B. Thus, the completed VSPT may include information for multiple, diverse paths originating in domain A, traversing domain B, and terminating within domain C. Once the multiple, diverse paths have been determined, a node, within domain A, may initiate establishment of the multiple, diverse paths using signaling, such as label switched path (LSP) signaling.

While systems and methods, as described herein, focus on computing shortest constrained paths across a sequence of domains, systems and methods, as described herein, are not so limited. For example, systems and methods, as described herein, may compute shortest constrained paths across a sequence of regions or layers, such as server layers, layers according to the Open Systems Interconnection (OSI) model, or the like. The term "section" will be used herein to refer generally to domains, regions, and layers.

Further, while systems and methods, as described herein, focus on computing a primary (e.g., working) path and a secondary (e.g., back-up or protection) path across a sequence of domains, systems and methods, as described herein, are not so limited. For example, systems and methods, as described herein, may compute any number of paths across the sequence of domains, such as a primary path and multiple secondary paths.

Figure 2:
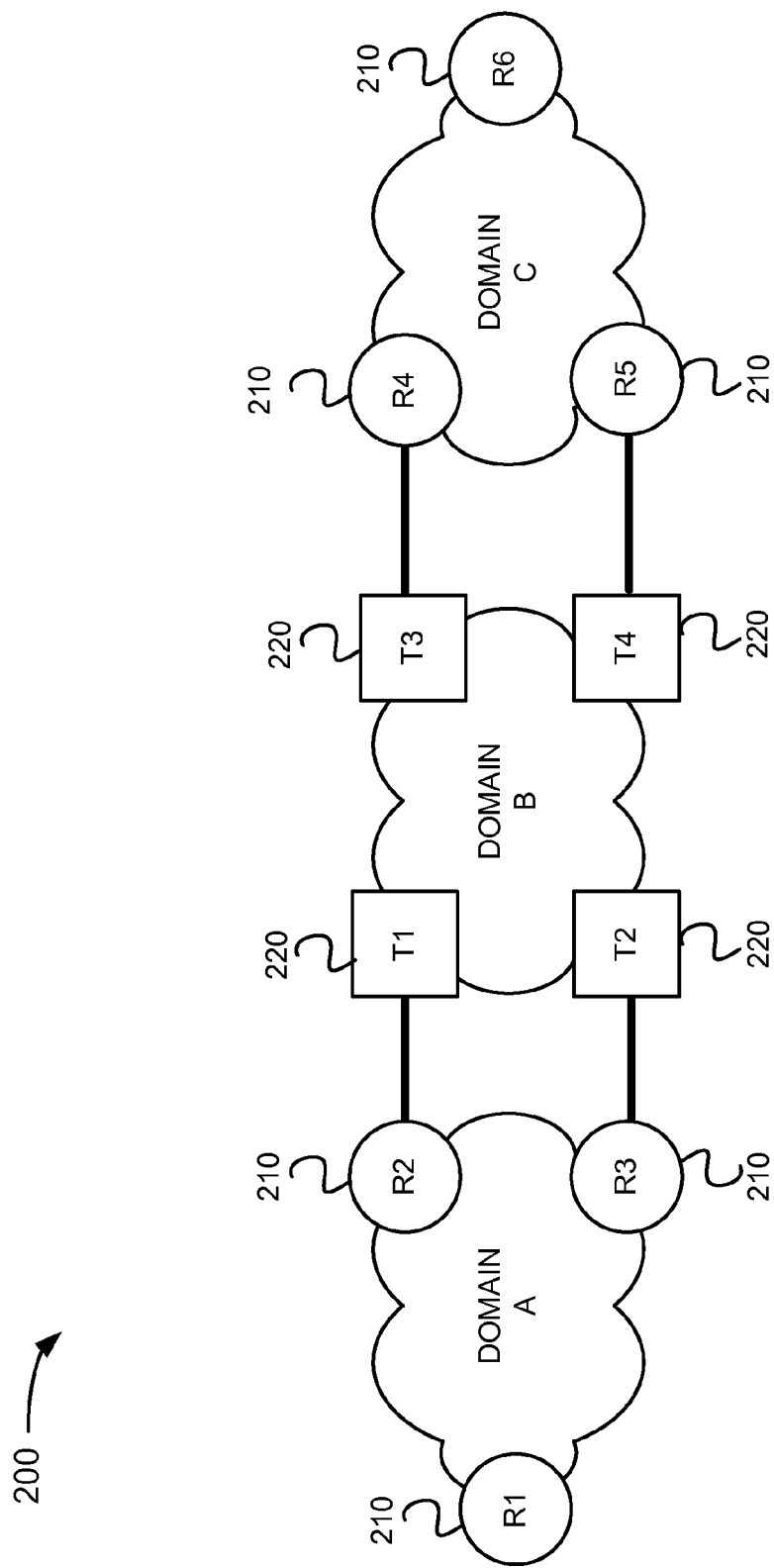
FIG. 2 is a diagram of an example environment in which systems and/or methods, described herein, may be implemented.

FIG. 2 is a diagram of an example environment 200 in which systems and/or methods, described herein, may be implemented. For example, environment 200 may include networks associated with multiple domains (shown as domain A, domain B, and domain C). While FIG. 2 shows three example domains, in practice, environment 200 may include additional or fewer domains.

Domain A may include multiple routing devices 210 (shown as routing devices R1, R2, and R3). Domain B may include multiple transport devices 220 (shown as transport devices T1, T2, T3, and T4). Domain C may include multiple routing devices 210 (shown as routing devices R4, R5, and R6).

A routing device 210 may include a network device that transmits and/or receives data signals. Examples of a routing device 210 include a router, a switch, a gateway, a hub, or another type of data transfer device. Routing device 210 may contain various components, such as input and output components and a controller to direct the transmission of a data signal from an input component to an output component.

A transport device 220 may include a digital switching device (e.g., an Optical Transport Network (OTN) switch), a Dense Wavelength Division Multiplexing (DWDM) device, or a device that is a combination of a digital switching device and a DWDM device. For example, a transport device may perform digital or optical multiplexing operations (e.g., receive individual data signals on individual channels and generate a multiplexed signal, such as a multiplexed digital signal or a multi-wavelength optical signal, that may be transmitted on a single channel), amplification operations (e.g., amplify the multiplexed signal), add-drop multiplexing operations (e.g., remove one or more data signals from the multiplexed signal), and/or demultiplexing operations (e.g., receive the multiplexed signal and separate the multiplexed signal back into individual data signals that may be transmitted on individual channels). To perform these operations, transport device 220 may contain various components, such as a multiplexer (to perform the multiplexing operations), an amplifier (to perform the amplification operations), an add-drop multiplexer (e.g., a remotely configurable add/drop multiplexer (ROADM)) (to perform the add-drop multiplexing operations), and/or a demultiplexer (to perform the demultiplexing operations).

While FIG. 2 shows a particular quantity and arrangement of domains and devices, environment 200 may include additional domains/devices, fewer domains/devices, different domains/devices, or differently arranged domains/devices than those illustrated in FIG. 2. For example, while not shown in environment 200, each domain may include additional routing or transport devices to facilitate the transport of data signals. In other words, the routing devices and transport devices, shown in FIG. 2, are merely shown as examples to facilitate an understanding of the description provided herein. The connections between routing and/or transport devices may be wired connections, wireless connections, direct connections, or indirect connections.

Figure 3:
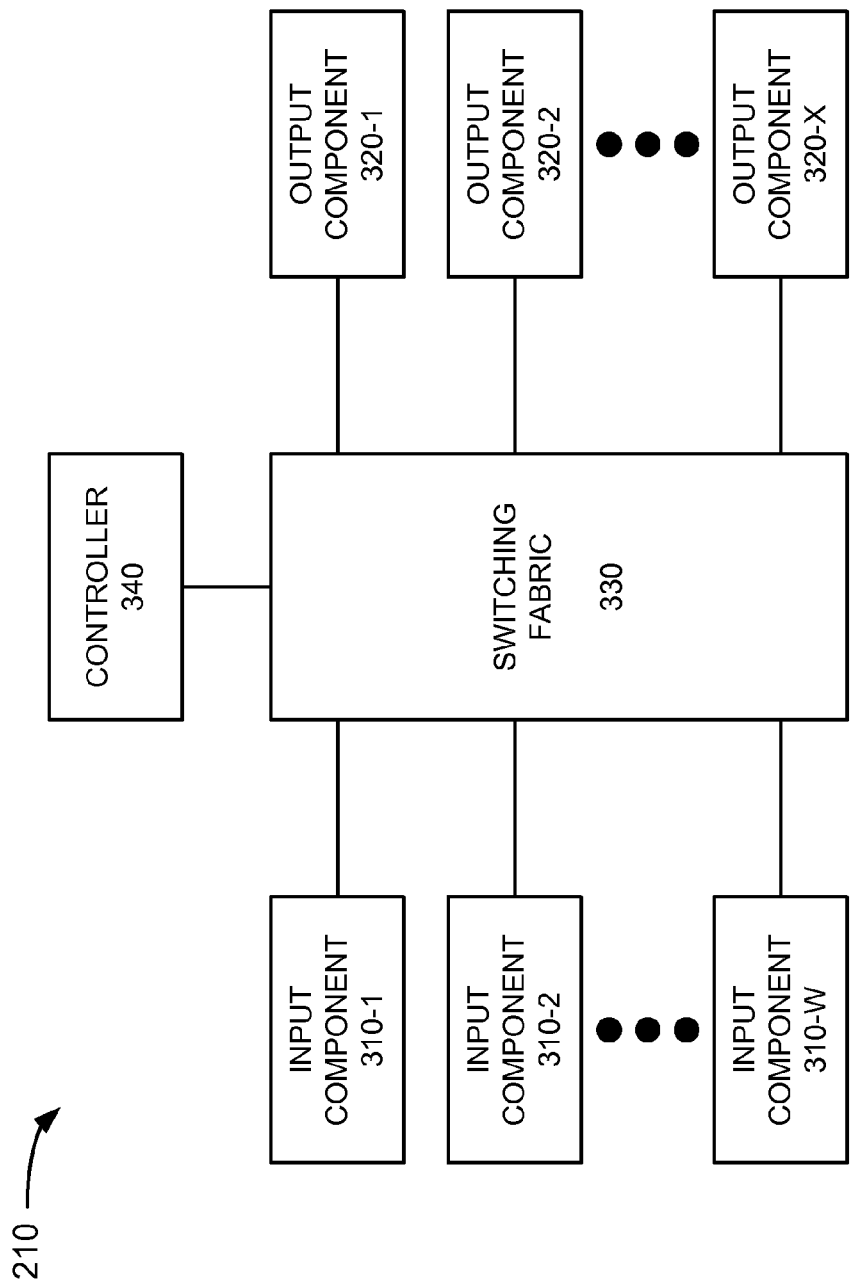
FIG. 3 is a diagram of example components of a routing device of FIG. 2.

FIG. 3 is a diagram of example components of a routing device 210. As shown in FIG. 3, routing device 210 may include input components 310-1, 310-2, . . . , 310-W (W≥1) (referred to collectively as "input components 310" and individually as "input component 310"), output components 320-1, 320-2, . . . , 320-X (X≥1) (referred to collectively as "output components 320" and individually as "output component 320"), switching fabric 330, and controller 340.

Input component 310 may include a component or a collection of components to process incoming data (e.g., data received on network links). Input component 310 may manage a port or a collection of ports via which the data can be received. Input component 310 may perform certain operations on incoming data, such as decapsulation, encapsulation, demultiplexing, multiplexing, queuing, etc. operations, that may facilitate the processing and/or transporting of the incoming data by other components of routing device 210.

Output component 320 may include a component or a collection of components to process outgoing data (e.g., data transmitted on network links). Output component 320 may manage a port or a collection of ports via which data can be transmitted. Output component 320 may perform certain operations on outgoing data, such as encapsulation, decapsulation, multiplexing, demultiplexing, queuing, prioritizing, etc. operations, that may facilitate the processing and/or transmission of the outgoing data from routing device 210.

Switching fabric 330 may include one or more switching planes to facilitate communication among input components 310, output components 320, and/or controller 340. In some implementations, each of the switching planes may include a single or multi-stage switch of crossbar elements. Switching fabric 330 may also, or alternatively, include processors, memories, and/or paths that permit communication among input components 310, output components 320, and/or controller 340.

Controller 340 may include one or more processors, microprocessors, application specific integrated circuits (ASICs), field programming gate arrays (FPGAs), or the like that are optimized for networking and communications. Controller 340 may also include static memory (e.g., a read only memory (ROM)), dynamic memory (e.g., a random access memory (RAM)), cache memory, and/or flash memory for storing data and/or machine-readable instructions.

Controller 340 may also communicate with other routing devices 210 to exchange information regarding network topology and labels to facilitate the label switching of data. Controller 340 may perform MPLS functions for routing device 210, such as label lookups, label popping, swapping, and/or pushing operations, routing decisions, etc. Controller 340 may also assist in establishing diverse paths across domains.

While FIG. 3 shows a particular quantity and arrangement of components, routing device 210 may include additional components, fewer components, different components, or differently arranged components than those illustrated in FIG. 3. Also, a function described as being performed by one of these components may be performed by another component in some implementations. For example, in some implementations, one or more of the functions of controller 340 may be implemented within input components 310, output components 320, and/or switching fabric 330.

Figure 4:
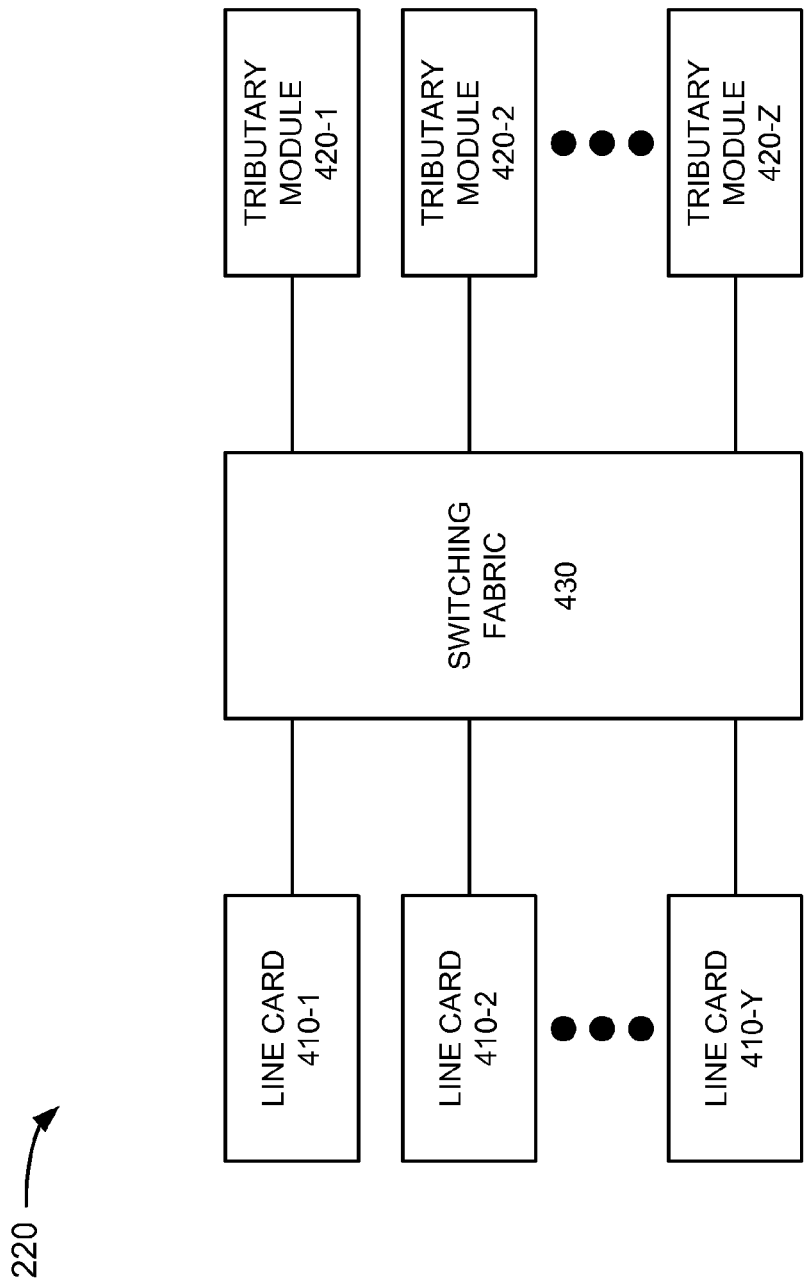
FIG. 4 is a diagram of example components of a transport device of FIG. 2.

FIG. 4 is a diagram of example components of a transport device 220. As shown in FIG. 4, transport device 220 may include line cards 410-1, 410-2, . . . , 410-Y (Y≥0) (referred to collectively as "line cards 410" and individually as "line card 410"), tributary modules 420-1, 420-2, . . . , 420-Z (Z≥0) (referred to collectively as "tributary modules 420" and individually as "tributary module 420"), and switching fabric 430.

Line card 410 may include hardware components, or a combination of hardware and software components, that connect to a link and provide signal processing services. Line card 410 may include a receiver and/or a transmitter. The receiver may receive a digital (or optical) signal from a link, and perform various processing on the signal, such as decoding, decapsulation, etc. The transmitter may perform various processing on a signal, such as encoding, encapsulation, etc., and transmit the signal on a link.

Tributary module 420 may include hardware components, or a combination of hardware and software components, that terminate client signals. For example, tributary module 420 may support flexible adding-dropping of multiple services, such as OTN services, Synchronous Optical Networking/Synchronous Digital Hierarchy (SONET/SDH) services, Gigabit Ethernet (GbE) services, and Fibre Channel (FC) services. In some implementations, tributary module 420 may encapsulate client signals in a data frame. The data frame may permit all types of services to be transparent and robustly managed.

Switching fabric 430 may include a switching architecture that permits cross-connects to be established between line cards 410, between tributary modules 420, and/or between line cards 410 and tributary modules 420.

While FIG. 4 shows a particular quantity and arrangement of components, transport device 220 may include additional components, fewer components, different components, or differently arranged components than those illustrated in FIG. 4. For example, transport device 220 may include line cards 410 and no tributary modules 420, or may include tributary modules 420 and no line cards 410. Additionally, or alternatively, transport device 220 may include a controller that may assist in the operation of transport device 220, such as the transmission of signals through transport device 220. Also, a function described as being performed by one of the components may be performed by another component in some implementations.

Figure 5:
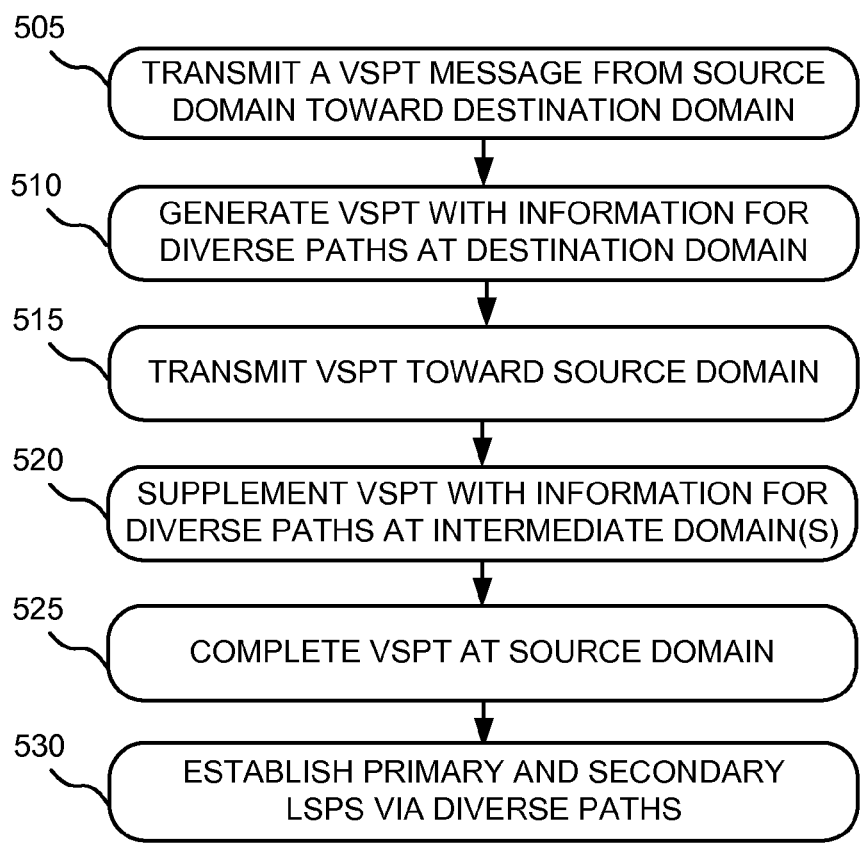
FIG. 5 is a flowchart of an example process for establishing diverse paths across multiple domains.

FIG. 5 is a flowchart of an example process 500 for establishing diverse paths across multiple domains. In some implementations, one or more blocks of process 500 may be performed by one or more routing devices 210 and/or transport devices 220 within environment 200.

Assume for purposes of the description of process 500 that it is desirable to compute diverse paths across a sequence of domains, such as the sequence of domains shown in FIG. 2. Assume that the sequence of domains includes a source domain, a destination domain, and one or more intermediate domains. There may be situations where there are no intermediate domains—rather, just a source domain and a destination domain.

In some situations, it may be desirable to compute diverse paths for recovery purposes. For example, it may be beneficial to compute a primary (e.g., working) path and a secondary (e.g., back-up or protection) path. The secondary path may be used where there is a failure in the primary path. In other words, if there is a failure in the primary path, traffic, which would have been transmitted over the primary path, may be transmitted over the secondary path.

It may be desirable to compute a fully diverse path as the secondary path. A fully diverse secondary path is a path that shares no nodes, links, interfaces, etc. with the primary path. A less-than-fully-diverse secondary path, on the other hand, is a path that may share one or more nodes, links, interfaces, etc. with the primary path, such as a source node, a destination node, or an intermediate node (i.e., a node between the source node and the destination node in the primary or secondary path).

As shown in FIG. 5, process 500 may include transmitting a VSPT message from a source domain toward a destination domain (block 505). For example, a source node may generate a VSPT message using, for example, the RSVP-TE signaling protocol. The VSPT message may identify one or more source nodes (in the source domain) and one or more destination nodes (in the destination domain) and may indicate whether fully diverse paths or less-than-fully-diverse paths are requested.

When the VSPT message indicates that fully diverse paths are requested, the VSPT message may include a request for multiple diverse VSPTs—e.g., a first VSPT corresponding to the primary path and a second VSPT corresponding to the secondary path. When the VSPT message indicates that less-than-fully-diverse paths are requested, the VSPT message may include a request for a VSPT with alternate diverse entry and exit points for the source domain, the destination domain, and the one or more intermediate domains.

The source node may transmit the VSPT message towards a destination node in the destination domain. The VSPT message may be received by one or more intermediate nodes, which may transmit the VSPT message until the VSPT message is received by the destination node.

Process 500 may include generating a VSPT with information for diverse paths at the destination domain (block 510). For example, the destination node, based on receiving the VSPT message, may generate a VSPT. The VSPT, as described above, may include a data structure that identifies nodes associated with a path. In some implementations, the VSPT may take the form of a tree with roots, branches, leaves, etc.

The destination node may have information regarding the topology of the destination domain but not the intermediate or source domains. Thus, the destination node may begin constructing the VSPT with information regarding entry points to the destination domain. In the situation where the source node requests fully diverse paths, the destination node may begin constructing two VSPTs—each with a different entry point (i.e., entry node) to the destination domain. In the situation where the source node requests less-than-fully-diverse paths, the destination node may begin constructing a single VSPT with multiple different entry points (i.e., entry nodes) to the destination domain.

Process 500 may include transmitting the VSPT toward the source domain (block 515). For example, the destination node may transmit the VSPT to zero or more other nodes in the destination domain, which may relay the VSPT to a node in an intermediate domain.

Process 500 may include supplementing the VSPT with information for diverse paths at one or more intermediate domains (block 520). For example, the VSPT may be received at an intermediate node in an intermediate domain. The intermediate node may have information regarding the topology of the intermediate domain but not the destination or source domains or any other intermediate domains. Thus, the intermediate node may supplement the VSPT with information regarding entry points to the intermediate domain and exit points from the intermediate domain. An entry point, of an intermediate domain, is located on a path closer to the source domain than the destination domain, and an exit point, of an intermediate domain, is located on a path closer to the destination domain than the source domain.

In the situation where the source node requests fully diverse paths, the intermediate node may supplement each of the two VSPTs—each with a different entry point (i.e., entry node) to the intermediate domain and each with a different exit point (i.e., exit node) from the intermediate domain. In the situation where the source node requests less-than-fully-diverse paths, the intermediate node may supplement the VSPT with multiple different entry points (i.e., entry nodes) to the intermediate domain and multiple different exit points (i.e., exit nodes) from the intermediate domain.

Blocks 515 and 520 may be repeated one or more times for each additional intermediate domain between the source domain and the destination domain. In other words, the intermediate node of a first intermediate domain may transmit the VSPT to zero or more other nodes in the first intermediate domain, which may relay the VSPT to a node in a second intermediate domain. The node, in the second intermediate domain, may supplement the VSPT with information regarding entry and exit points of the second intermediate domain, and may forward the VSPT to a node in a third intermediate domain or a node in the source domain.

Block 520 may be skipped when there is no intermediate domain between the source domain and the destination domain. In this case, a node in the destination domain may transmit the VSPT to a node in the source domain.

In any event, the VSPT may be transmitted to and received by the source node in the source domain. The source node may receive the VSPT from a node in an intermediate domain, a node in the destination domain, or another node in the source domain.

Process 500 may include completing the VSPT at the source domain (block 525). For example, the source node may receive the VSPT as described above. The source node may have information regarding the topology of the source domain but not the destination or intermediate domains. Thus, the source node may complete the VSPT with information regarding exit points from the source domain. The completed VSPT may include information regarding nodes associated with multiple diverse paths between the source domain and the destination domain.

In the situation where the source node requests fully diverse paths, the source node may complete each of the two VSPTs—each with a different exit point (i.e., exit node) from the source domain. In the situation where the source node requests less-than-fully-diverse paths, the source node may complete the VSPT with multiple different exit points (i.e., exit nodes) from the source domain.

Process 500 may include establishing primary and secondary label switched paths via the diverse paths (block 530). For example, the source node (and/or another node in the source domain) may initiate signaling to establish a primary label switched path and a secondary label switched path using the VSPT. Assume that the primary label switched path corresponds to the primary path, and the secondary label switched path corresponds to the secondary path.

In the situation where the source node requests fully diverse paths, the source node may initiate signaling to establish the primary label switched path using one of the two VSPTs, and another node, within the source domain, may initiate signaling to establish the secondary label switched path using the other of the two VSPTs. In this case, the primary label switched path may include no nodes in common with the secondary label switched path.

In the situation where the source node requests less-than-fully-diverse paths, the source node may initiate signaling to establish both the primary and secondary label switched paths using the VSPT. In this case, the primary label switched path may include one or more nodes in common with the secondary label switched path, such as a common source node, a common destination node, and/or a common intermediate node.

To establish a label switched path (either the primary label switched path or the secondary label switched path), control messages (e.g., GMPLS control messages) may be sent from node-to-node on the label switched path and include information for setting up and storing control plane labels for a control plane tunnel. These control messages may also, or alternatively, include information for setting up and storing data plane labels for a data plane tunnel. In other words, the same control messages may include information for setting up control plane labels, and information for setting up data plane labels. Establishing a control plane tunnel or a data plane tunnel may also involve programming the switching fabric (e.g., switching fabric 430) of one or more nodes to establish the appropriate cross-connects through the switching fabric.

The source node may transmit traffic (e.g., via the data plane tunnel) to the destination node on the primary label switched path (i.e., the primary path). In the event of a failure on the primary label switched path, the source node may transmit traffic (e.g., via the data plane tunnel) to the destination node on the secondary label switched path (i.e., the secondary path). In addition, VSPT messaging may be included as part of the regular refresh cycles. As a result, label switched path modifications would not require an additional step that would be needed when using PCEs.

In some implementations, the primary path and the secondary path may be pre-computed to facilitate a switch-over from the primary path to the secondary path in the event of a failure of the primary path. In other implementations, the primary path and/or the secondary path may be computed in response to a failure of the primary path.

While a series of blocks has been described with regard to FIG. 5, the order of the blocks may be modified in other implementations. Further, non-dependent blocks may be performed in parallel.

Figure 6A:
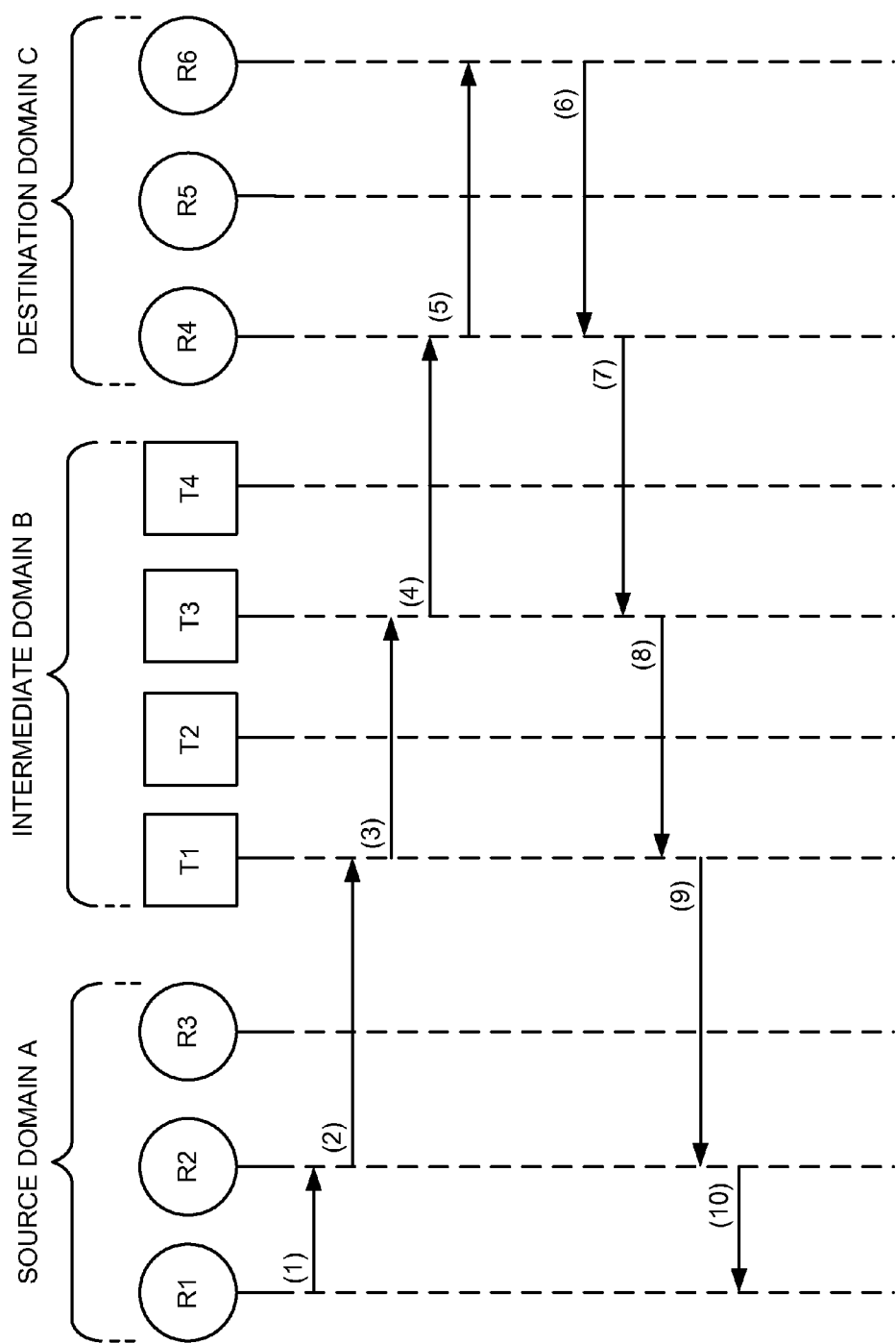
FIGS. 6A-6C illustrate an example for establishing multiple diverse paths across multiple domains.
Figure 6B:
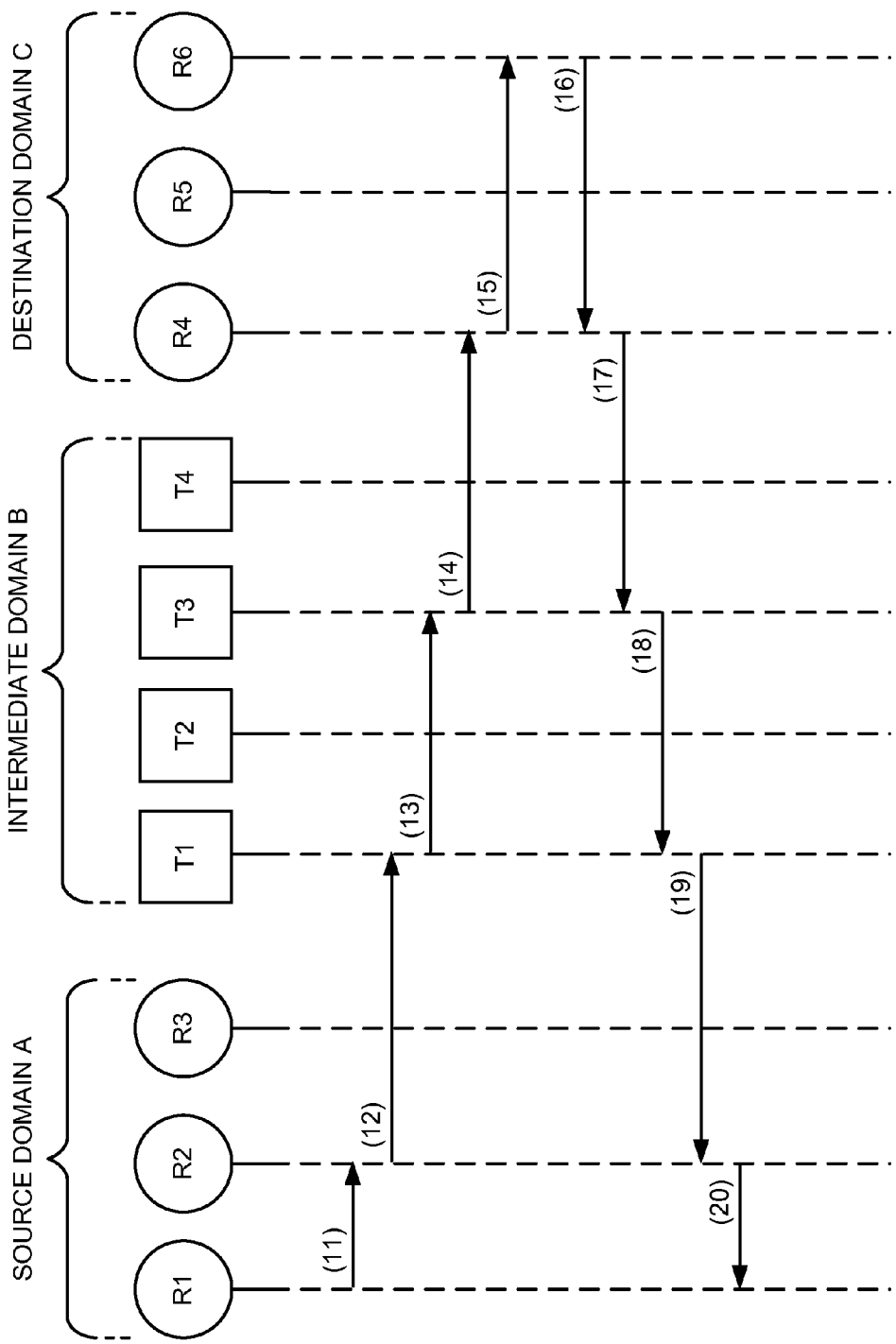
Figure 6C:
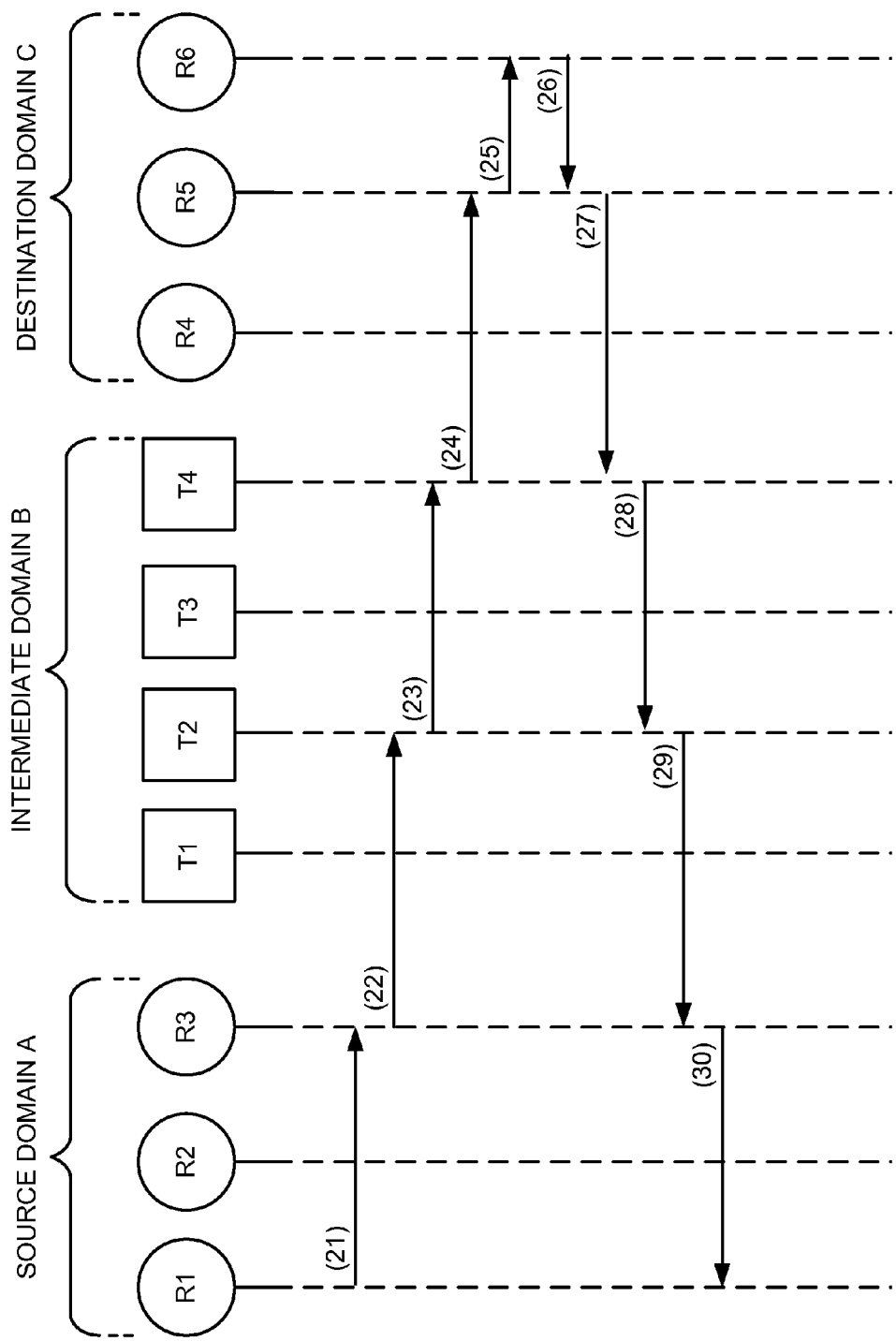

FIGS. 6A-6C illustrate an example for establishing multiple diverse paths across multiple domains. Assume, for the purpose of this example, that the multiple diverse paths are established in an environment similar to environment 200 in FIG. 2. As shown in FIGS. 6A-6C, assume that there are three domains: domain A, domain B, and domain C. Domain A includes three routing devices: routing device R1, routing device R2, and routing device R3. Domain B includes four transport devices: transport device T1, transport device T2, transport device T3, and transport device T4. Domain C includes three routing devices: routing device R4, routing device R5, and routing device R6. The routing devices and transport devices will be referred to generally as nodes. Assume that the nodes are connected as shown in FIG. 2. Also assume that domain A is the source domain, domain B is the intermediate domain, and domain C is the destination domain.

To establish diverse paths between a source node (e.g., node R1) and a destination node (e.g., node R6), the source node R1 initiates VSPT messaging using the RSVP-TE signaling protocol. For example, source node R1 may generate a VSPT message that includes a request for a VSPT that includes multiple diverse entry and exit points. The VSPT message may identify the destination node R6 and/or destination domain C. The source node R1 transmits the VSPT message toward destination node R6 and/or destination domain C by transmitting the VSPT message to node R2, which serves as an exit point for source domain A (shown as (1) in FIG. 6A). The VSPT message may traverse one or more other nodes, in source domain A, before reaching node R2 (not shown in FIG. 6A).

Node R2 receives the VSPT message, identifies that the VSPT message is intended for destination node R6 and/or destination domain C, and transmits the VSPT message to node T1, which serves as an entry point for intermediate domain B (shown as (2) in FIG. 6A). Node T1 receives the VSPT message, identifies that the VSPT message is intended for destination node R6 and/or destination domain C, and transmits the VSPT message to node T3, which serves as an exit point for intermediate domain B (shown as (3) in FIG. 6A). The VSPT message may traverse one or more other nodes, in intermediate domain B, before reaching node T3 (not shown in FIG. 6A).

Node T3 receives the VSPT message, identifies that the VSPT message is intended for destination node R6 and/or destination domain C, and transmits the VSPT message to node R4, which serves as an entry point for destination domain C (shown as (4) in FIG. 6A). Node R4 receives the VSPT message, identifies that the VSPT message is intended for destination node R6, and transmits the VSPT message to destination node R6 (shown as (5) in FIG. 6A). The VSPT message may traverse one or more other nodes, in destination domain C, before reaching destination node R6 (not shown in FIG. 6A).

Destination node R6 receives the VSPT message and analyzes the VSPT message to determine that source node R1 requests a VSPT with multiple diverse entry and exit points. Destination node R6 obtains topology information regarding destination domain C. Destination node R6 may use the topology information to identify diverse entry points to destination domain C. Assume that destination node R6 identifies node R4 and node R5 as diverse entry points to destination domain C.

Destination node R6 may begin generating the VSPT. For example, destination node R6 may include, in the VSPT, information identifying nodes R4 and R5 as two alternatives to reach destination node R6. In one example, destination node R6 may populate the VSPT with:

TE-dest=node R6; BN-en(1,DC)=node R4; BN-en(2,DC)=node R5, where TE-dest refers to the destination node (i.e., node R6), BN-en (1,DC) refers to a node that serves as an entry point for domain C (i.e., node R4) for the primary path, and BN-en (2,DC) refers to a node that serves as an entry point for domain C (i.e., node R5) for the secondary path.

Destination node R6 transmits the VSPT to node R4 (shown as (6) in FIG. 6A). Node R4 receives the VSPT and sends the VSPT to node T3 (shown as (7) in FIG. 6A). Node T3 obtains topology information regarding intermediate domain B. Node T3 may use the topology information to identify diverse entry points to intermediate domain B and diverse exit points from intermediate domain B. Assume that node T3 identifies node T1 and node T2 as diverse entry points to intermediate domain B, and node T3 and node T4 as diverse exit points from intermediate domain B.

Node T3 may supplement the VSPT. For example, node T3 may include, in the VSPT, information identifying nodes T1, T2, T3, and T4. In one example, node T3 may supplement the VSPT with:

BN-en (1,DB)=node T1; BN-en (2,DB)=node T2;
BN-ex (1,DB)=node T3; BN-ex (2,DB)=node T4, where BN-en (1,DB) refers to a node that serves as an entry point for domain B (i.e., node T1) for the primary path, BN-en (2,DB) refers to a node that serves as an entry point for domain B (i.e., node T2) for the secondary path, BN-ex (1,DB) refers to a node that serves as an exit point for domain B (i.e., node T3) for the primary path, BN-ex (2,DB) refers to a node that serves as an exit point for domain B (i.e., node T4) for the secondary path.

Node T3 transmits the VSPT to node T1 (shown as (8) in FIG. 6A). Node T1 receives the VSPT and sends the VSPT to node R2 (shown as (9) in FIG. 6A). Node R2 forwards the VSPT to the source node R1 (shown as (10) in FIG. 6A). Source node R1 obtains topology information regarding source domain A. Source node R1 may use the topology information to identify diverse exit points from source domain A. Assume that node R1 identifies node R2 and node R3 as diverse exit points from source domain A.

Source node R1 may complete the VSPT. For example, node R1 may include, in the VSPT, information identifying nodes R1, R2, and/or R3. In one example, node R1 may supplement the VSPT with:

TE-src=node R1; BN-ex (1,DA)=node R2; BN-ex (2,DA) =node R3, where TE-src refers to the source node (i.e., node R1), BN-ex (1,DA) refers to a node that serves as an exit point for domain A (i.e., node R2) for the primary path, and BN-ex (2,DA) refers to a node that serves as an exit point for domain A (i.e., node R3) for the secondary path.

As a result, source node R1 generates a VSPT that includes two diverse paths, with alternate entry and exit points, from source node R1 to destination node R6. The primary path includes: source node R1, node R2, node T1, node T3, node R4, and destination node R6. The secondary path includes: source node R1, node R3, node T2, node T4, node R5, and destination node R6. The primary and secondary paths include alternate exit points from source domain A (i.e., nodes R2 and R3), alternate entry points to intermediate domain B (i.e., nodes T1 and T2), alternate exit points from intermediate domain B (i.e., nodes T3 and T4), and alternate entry points to destination domain C (i.e., nodes R4 and R5).

Once node R1 completes the VSPT, node R1 initiates primary label switched path signaling (FIG. 6B) and secondary label switched path signaling (FIG. 6C). As shown in FIG. 6B, source node R1 transmits one or more control messages from node-to-node along the primary path to destination node R6 (shown as (11) through (15) in FIG. 6B). Each node, along the primary path, may store one or more labels, establish one or more tunnels, configure one or more cross-connects through a switch fabric, and/or perform one or more other operations relating to establishing the primary path. Upon successful establishment of the primary path, destination node R6 may transmit one or more acknowledgment messages from node-to-node along the primary path to source node R1 (shown as (16) through (20) in FIG. 6B).

As shown in FIG. 6C, source node R1 transmits one or more control messages from node-to-node along the secondary path to destination node R6 (shown as (21) through (25) in FIG. 6C). Each node, along the secondary path, may store one or more labels, establish one or more tunnels, configure one or more cross-connects through a switch fabric, and/or perform one or more other operations relating to establishing the secondary path. Upon successful establishment of the secondary path, destination node R6 may transmit one or more acknowledgment messages from node-to-node along the secondary path to source node R1 (shown as (26) through (30) in FIG. 6C).

As a result of the above process, two less than fully diverse paths may be established across multiple domains. Data traffic may be transmitted over the primary path and, in the event of a failure of the primary path, the data traffic may be switched over to the secondary path.

Figure 7A:
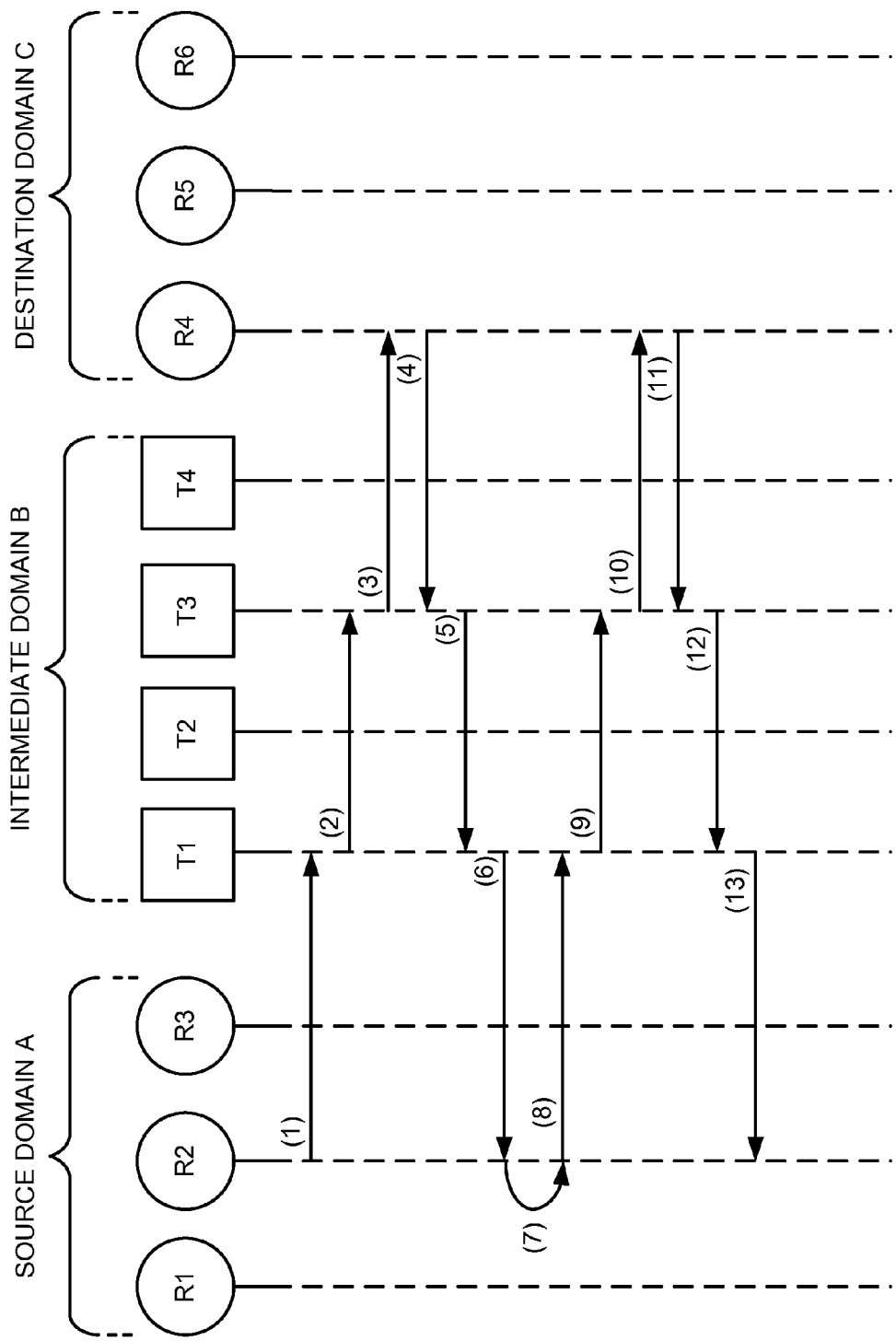
FIGS. 7A-7B illustrate another example for establishing multiple diverse paths across multiple domains.
Figure 7B:
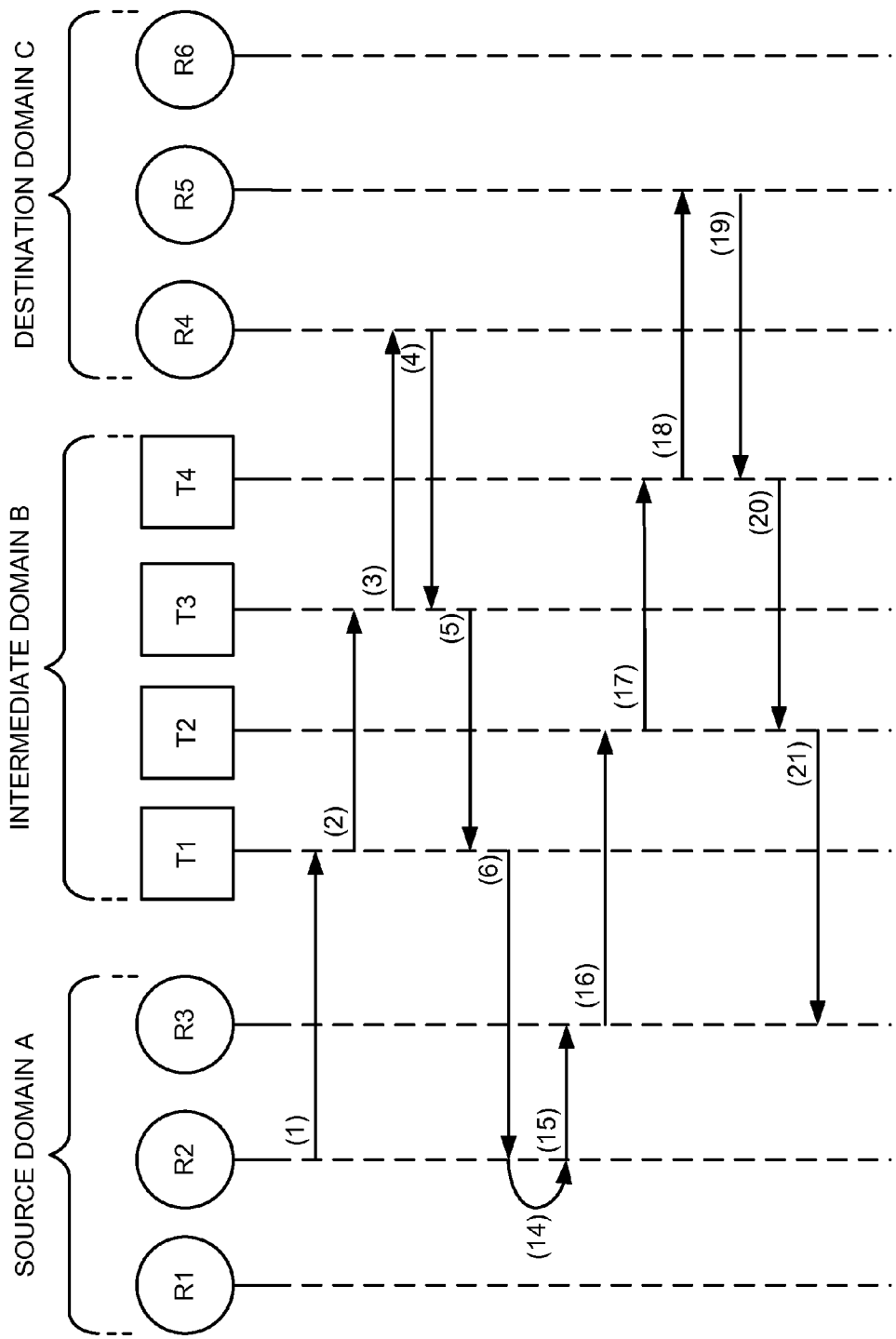

FIGS. 7A and 7B illustrate another example for establishing multiple diverse paths across multiple domains. Assume, for the purpose of this example, that the multiple diverse paths are established in an environment similar to environment 200 in FIG. 2. As shown in FIGS. 7A and 7B, assume that there are three domains: domain A, domain B, and domain C. Domain A includes three routing devices: routing device R1, routing device R2, and routing device R3. Domain B includes four transport devices: transport device T1, transport device T2, transport device T3, and transport device T4. Domain C includes three routing devices: routing device R4, routing device R5, and routing device R6. The routing devices and transport devices will be referred to generally as nodes. Assume that the nodes are connected as shown in FIG. 2. Also assume that domain A is the source domain, domain B is the intermediate domain, and domain C is the destination domain.

To establish fully diverse paths between source domain A and destination domain C, a node (e.g., node R2), within source domain A, initiates VSPT messaging using the RSVP-TE signaling protocol. For example, node R2 may generate a VSPT message that includes a request for multiple VSPTs that include diverse entry and exit points. The VSPT message may identify destination domain C and/or one or more nodes in destination domain C (e.g., node R4 or R5). Node R2 transmits the VSPT message toward node R4, node R5, and/or destination domain C by transmitting the VSPT message to node T1, which serves as an entry point for intermediate domain B (shown as (1) in FIG. 7A). Node T1 receives the VSPT message, identifies that the VSPT message is intended for node R4, node R5, and/or destination domain C, and transmits the VSPT message to node T3, which serves as an exit point for intermediate domain B (shown as (2) in FIG. 7A). The VSPT message may traverse one or more other nodes, in intermediate domain B, before reaching node T3 (not shown in FIG. 7A).

Node T3 receives the VSPT message, identifies, for example, that the VSPT message is intended for node R4 and/or destination domain C, and transmits the VSPT message to node R4, which serves as an entry point for destination domain C (shown as (3) in FIG. 7A). Node R4 receives the VSPT message and analyzes the VSPT message to determine that node R2 requests multiple VSPTs with diverse entry and exit points. Node R4 obtains topology information regarding destination domain C. Node R4 may use the topology information to identify diverse entry points to destination domain C. Assume that node R4 identifies node R4 and node R5 as diverse entry points to destination domain C.

Node R4 may begin generating the VSPTs. For example, node R4 may include, in a first VSPT, information identifying node R4, and may include, in a second VSPT, information identifying node R5. In one example, node R4 may populate the first VSPT with:

TE-dest=node R4; BN-en (1,DC)=node R4, where TE-dest refers to the destination node (i.e., node R4), and BN-en (1,DC) refers to a node that serves as an entry point for domain C (i.e., node R4) for the primary path. Continuing with this example, node R4 may populate the second VSPT with:

TE-dest=node R5; BN-en (2,DC)=node R5, where TE-dest refers to the destination node (i.e., node R5), and BN-en (2,DC) refers to a node that serves as an entry point for domain C (i.e., node R5) for the secondary path.

Node R4 transmits the first and second VSPTs to node T3 (shown as (4) in FIG. 7A). Node T3 obtains topology information regarding intermediate domain B. Node T3 may use the topology information to identify diverse entry points to intermediate domain B and diverse exit points from intermediate domain B. Assume that node T3 identifies node T1 and node T2 as diverse entry points to intermediate domain B, and node T3 and node T4 as diverse exit points from intermediate domain B.

Node T3 may supplement the first and second VSPTs. For example, node T3 may include, in the first VSPT, information identifying nodes T1 and T3. In one example, node T3 may supplement the first VSPT with:

BN-en (1,DB)=node T1; BN-ex (1,DB)=node T3, where BN-en (1,DB) refers to a node that serves as an entry point for domain B (i.e., node T1) for the primary path, and BN-ex (1,DB) refers to a node that serves as an exit point for domain B (i.e., node T3) for the primary path. Continuing with this example, node T3 may supplement the second VSPT with:

BN-en (2,DB)=node T2; BN-ex (2,DB)=node T4, where BN-en (2,DB) refers to a node that serves as an entry point for domain B (i.e., node T2) for the secondary path, and BN-ex (2,DB) refers to a node that serves as an exit point for domain B (i.e., node T4) for the secondary path.

Node T3 transmits the first and second VSPTs to node T1 (shown as (5) in FIG. 7A). Node T1 receives the first and second VSPTs and sends the first and second VSPTs to node R2 (shown as (6) in FIG. 7A). Node R2 obtains topology information regarding source domain A. Node R2 may use the topology information to identify diverse exit points from source domain A. Assume that node R2 identifies node R2 and node R3 as diverse exit points from source domain A.

Node R2 may complete the first and second VSPTs. For example, node R1 may include, in the first VSPT, information identifying node R2. In one example, node R2 may supplement the first VSPT with:

BN-ex (1,DA)=node R2, where BN-ex (1,DA) refers to a node that serves as an exit point for domain A (i.e., node R2) for the primary path. Continuing with the example, node R2 may supplement the second VSPT with:

BN-ex (2,DA)=node R3, where BN-ex (2,DA) refers to a node that serves as an exit point for domain A (i.e., node R3) for the secondary path.

As a result, node R2 generates first and second VSPTs that include two fully diverse paths, with alternate entry and exit points, from source domain A to destination domain C. The primary path includes: node R2, node T1, node T3, and node R4. The secondary path includes: node R3, node T2, node T4, and node R5. The primary and secondary paths include alternate source nodes (i.e., nodes R2 and R3), alternate exit points from source domain A (i.e., nodes R2 and R3), alternate entry points to intermediate domain B (i.e., nodes T1 and T2), alternate exit points from intermediate domain B (i.e., nodes T3 and T4), alternate entry points to destination domain C (i.e., nodes R4 and R5), and alternate destination nodes (e.g., nodes R4 and R5).

Once node R2 completes the first and second VSPTs, node R1 initiates primary label switched path signaling (FIG. 7A) and secondary label switched path signaling (FIG. 7B). As shown in FIG. 7A, node R2 may make a decision and/or provide a signal to node R2 to initiate the primary label switched path signaling (shown as (7) in FIG. 7A). Node R2 transmits one or more control messages from node-to-node along the primary path to node R4 (shown as (8) through (10) in FIG. 7A). Each node, along the primary path, may store one or more labels, establish one or more tunnels, configure one or more cross-connects through a switch fabric, and/or perform one or more other operations relating to establishing the primary path. Upon successful establishment of the primary path, node R4 may transmit one or more acknowledgment messages from node-to-node along the primary path to node R2 (shown as (11) through (13) in FIG. 7A).

As shown in FIG. 7B (which repeats (1) through (6) from FIG. 7A to facilitate understanding), node R2 may make a decision and/or provide a signal to node R2 to initiate the secondary label switched path signaling (shown as (14) in FIG. 7B). To initiate the secondary label switched path signaling, node R2 transmits a message to node R3 (shown as (15) in FIG. 7B). The message may include information regarding the second VSPT and/or an instruction to initiate label switched path signaling to establish the secondary path to node R5.

Node R3 transmits one or more control messages from node-to-node along the secondary path to node R5 (shown as (16) through (18) in FIG. 7B). Each node, along the secondary path, may store one or more labels, establish one or more tunnels, configure one or more cross-connects through a switch fabric, and/or perform one or more other operations relating to establishing the secondary path. Upon successful establishment of the secondary path, node R5 may transmit one or more acknowledgment messages from node-to-node along the secondary path to node R3 (shown as (19) through (21) in FIG. 7B).

As a result of the above process, two fully diverse paths may be established across multiple domains. Data traffic may be transmitted over the primary path and, in the event of a failure of the primary path, the data traffic may be switched over to the secondary path.

An implementation, described herein, may compute multiple diverse paths across a sequence of domains using a backward-recursive path computation technique based on the RSVP-TE signaling protocol and without using PCEs.

The foregoing description provides illustration and description, but is not intended to be exhaustive or to limit the implementations to the precise form disclosed. Modifications and variations are possible in light of the above disclosure or may be acquired from practice of the implementations.

For example, while the description above relates to establishing diverse primary and secondary paths across multiple domains, in some implementations, similar operations may be performed to establish multiple secondary (e.g., back-up or protection) paths across the multiple domains.

Also, while the description used VSPT as a data structure for conveying information regarding the multiple diverse paths, in some implementations, another type of data structure, such as a linked list, a hash table, an array, or the like, may alternatively be used.

Further, certain portions of the implementations have been described as "components" that perform one or more functions. The term "component," as used herein, may include hardware, such as a processor, an ASIC, or a FPGA, or a combination of hardware and software. The term "hardware component," as used herein, may refer to a component that is implemented strictly in hardware, such as an ASIC or a FPGA.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    transmitting a message, for computing diverse paths through a network that includes a plurality of domains, using a Resource Reservation Protocol-Traffic Engineering (RSVP-TE) signaling protocol,
        the message being transmitted from a first node in a first domain, of the plurality of domains, to a second node in a second domain of the plurality of domains;
    generating, by the second node in the second domain, at least one data structure that identifies multiple diverse entry points to the second domain;
    transmitting the at least one data structure toward the first node in the first domain;
    completing, by the first node in the first domain, the at least one data structure to form at least one completed data structure,
        the at least one completed data structure identifying multiple diverse exit points from the first domain and the multiple diverse entry points to the second domain;
    causing, using a first data structure of the at least one completed data structure, a primary path from the first domain to the second domain to be established,
        the primary path including a first exit point, of the multiple diverse exit points from the first domain, and a first entry point of the multiple diverse entry points to the second domain; and
    causing, using a second data structure of the at least one completed data structure, a secondary path from the first domain to the second domain to be established, the secondary path including a second exit point, of the multiple diverse exit points from the first domain, and a second entry point of the multiple diverse entry points to the second domain,
    wherein the primary and secondary paths are not computed using a Path Computation Element (PCE).

2. The method of claim 1, where the message indicates whether a fully diverse path or a less-than fully diverse path is requested, and
    where generating the at least one data structure includes:
        determining that the message indicates that the fully diverse path is requested, and
        generating multiple data structures when the message indicates that the fully diverse path is requested,
            the multiple data structures including the first data structure and the second data structure,
            the first data structure being different from the second data structure.

3. The method of claim 1, where the message indicates whether a fully diverse path or a less-than fully diverse path is requested, and
    where generating the at least one data structure includes:
        determining that the message indicates that the less-than fully diverse path is requested, and
        generating a single data structure when the message indicates that the less-than fully diverse path is requested,
            the single data structure including the first data structure and the second data structure,
            the first data structure being part of a same data structure as the second data structure.

4. The method of claim 1, further comprising:
    computing the primary path using the first data structure; and
    computing the secondary path using the second data structure,
        the primary path including no nodes, links, or interfaces in common with the secondary path.

5. The method of claim 1, further comprising:
    computing the primary path using the first data structure; and
    computing the secondary path using the second data structure,
        the primary path including at least one node, link, or interface in common with the secondary path.

6. The method of claim 1, further comprising:
    receiving, at a third node in a third domain, the at least one data structure; and
    supplementing, by the third node, the at least one data structure to form at least one supplemented data structure,
        the at least one supplemented data structure identifying multiple diverse entry points to the third domain, multiple diverse exit points from the third domain, and the multiple diverse entry points to the second domain,
    where completing the at least one data structure includes:
        completing the at least one supplemented data structure to form the at least one completed data structure,
            the at least one completed data structure identifying the multiple diverse exit points from the first domain, the multiple diverse entry points to the third domain, the multiple diverse exit points from the third domain, and the multiple diverse entry points to the second domain.

7. The method of claim 1, where causing the secondary path to be established includes:
    sending, from the first node in the first domain to a second node in the first domain, the second data structure and an instruction for the second node in the first domain to initiate establishment of the secondary path.

8. A system comprising:

a plurality of nodes in a network that includes a plurality of sections, one or more nodes, of the plurality of nodes, being configured to:

transmit a message, for computing diverse paths through the network from a first section, of the plurality of sections, to a second section of the plurality of sections, using a Resource Reservation Protocol-Traffic Engineering (RSVP-TE) signaling protocol, the message being transmitted from a first node, in the first section, to a second node in the second section;

generate, by the second node in the second section, at least one data structure that identifies multiple diverse entry points to the second section;

transmit the at least one data structure toward the first node in the first section;

complete, by the first node in the first section, the at least one data structure to form at least one completed data structure, the at least one completed data structure identifying multiple diverse exit points from the first section and the multiple diverse entry points to the second section;

cause, using a first data structure of the at least one completed data structure, a primary path from the first section to the second section to be established, the primary path including a first exit point, of the multiple diverse exit points from the first section, and a first entry point of the multiple diverse entry points to the second section; and cause, using a second data structure of the at least one completed data structure, a secondary path from the first section to the second section to be established, the secondary path including a second exit point, of the multiple diverse exit points from the first section, and a second entry point of the multiple diverse entry points to the second section, wherein the primary and secondary paths are not computed using a Path Computation Element (PCE).

9. The system of claim 8, where the message indicates whether a fully diverse path or a less-than fully diverse path is requested, and where the second node, when generating the at least one data structure, is configured to:

determine that the message indicates that the fully diverse path is requested, and generate multiple data structures when the message indicates that the fully diverse path is requested, the multiple data structures including the first data structure and the second data structure, the first data structure being different from the second data structure.

10. The system of claim 8, where the message indicates whether a fully diverse path or a less-than fully diverse path is requested, and where the second node, when generating the at least one data structure, is configured to:

determine that the message indicates that the less-than fully diverse path is requested, and generate a single data structure when the message indicates that the less-than fully diverse path is requested, the single data structure including the first data structure and the second data structure, the first data structure being part of a same data structure as the second data structure.

11. The system of claim 8, where the second node, when generating the at least one data structure, is configured to:

obtain information regarding a topology of the second section, identify, using the information regarding the topology of the second section, the multiple diverse entry points to the second section, and generate the at least one data structure to identify the multiple diverse entry points to the second section.

12. The system of claim 8, where the first node, when completing the at least one data structure, is configured to:

obtain information regarding a topology of the first section, identify, using the information regarding the topology of the first section, the multiple diverse exit points from the first section, and complete the at least one data structure to identify the multiple diverse exit points from the first section.

13. The system of claim 8, where the one or more nodes, when causing the primary path to be established, are configured to:

transmit a signal via the first exit point and the first entry point to establish a first label switched path as the primary path, and where the one or more nodes, when causing the secondary path to be established, are configured to:

transmit a signal via the second exit point and the second entry point to establish a second label switched path as the secondary path.

14. The system of claim 8, where the one or more nodes are further configured to:

establish, using a third data structure of the at least one completed data structure, an additional secondary path from the first section to the second section, the additional secondary path including a third exit point, of the multiple diverse exit points from the first section, and a third entry point of the multiple diverse entry points to the second section.

15. A system comprising:

a plurality of nodes in a network that includes a plurality of domains or layers, one or more nodes, of the plurality of nodes, being configured to:

transmit a message, for computing diverse paths through the network from a first domain or layer, of the plurality of domains or layers, to a second domain or layer of the plurality of domains or layers, using a Resource Reservation Protocol-Traffic Engineering (RSVP-TE) signaling protocol, the message being transmitted from a first node, in the first domain or layer, to a second node in the second domain or layer;

generate, by the second node in the second domain or layer, at least one data structure that identifies multiple diverse entry points to the second domain or layer;

transmit the at least one data structure toward the first node in the first domain or layer;

complete, by the first node in the first domain or layer, the at least one data structure to form at least one completed data structure, the at least one completed data structure identifying multiple diverse exit points from the first domain or layer and the multiple diverse entry points to the second domain or layer;
use a first data structure, of the at least one completed data structure, to compute a primary path from the first domain or layer to the second domain or layer, the primary path including a first exit point, of the multiple diverse exit points from the first domain or layer, and a first entry point of the multiple diverse entry points to the second domain or layer; and
use a second data structure, of the at least one completed data structure, to compute a secondary path from the first domain or layer to the second domain or layer,
the secondary path including a second exit point, of the multiple diverse exit points from the first domain or layer, and a second entry point of the multiple diverse entry points to the second domain or layer,
wherein the primary and secondary paths are not computed using a Path Computation Element (PCE).

16. The system of claim 15, where the primary path includes no nodes, links, or interfaces in common with the secondary path,
the primary path corresponding to a working path and the secondary path corresponding to a protection path for the working path.

17. The system of claim 15, where the primary path includes at least one node, link, or interface in common with the secondary path,
the primary path corresponding to a working path and the secondary path corresponding to a protection path for the working path.

18. The system of claim 15, where the plurality of nodes includes a third node in a third domain or layer of the plurality of domains or layers,
the third node being configured to:
receive the at least one data structure; and
supplement the at least one data structure to form at least one supplemented data structure,
the at least one supplemented data structure identifying multiple diverse entry points to the third domain or layer, multiple diverse exit points from the third domain or layer, and the multiple diverse entry points to the second domain or layer,
where the first node, when completing the at least one data structure, is configured to:
complete the at least one supplemented data structure to form the at least one completed data structure,
the at least one completed data structure identifying the multiple diverse exit points from the first domain or layer, the multiple diverse entry points to the third domain or layer, the multiple diverse exit points from the third domain or layer, and the multiple diverse entry points to the second domain or layer.

19. The system of claim 15, where the second node, when generating the at least one data structure, is configured to:
obtain information regarding a topology of the second domain or layer,
identify, using the information regarding the topology of the second domain or layer, the multiple diverse entry points to the second domain or layer, and
generate the at least one data structure to identify the multiple diverse entry points to the second domain or layer.

20. The system of claim 15, where the one or more nodes are further configured to:
transmit a signal via the first exit point and the first entry point to establish a first label switched path as the primary path; and
transmit a signal via the second exit point and the second entry point to establish a second label switched path as the secondary path.

21. The system of claim 15, wherein said one or more of the plurality of nodes includes a transport device comprising a plurality of line cards, each of which being coupled to a link, such that said one or more of the plurality of nodes provides a wavelength division multiplexed optical signal, the link carrying the message.

* * * * *